2,729,506

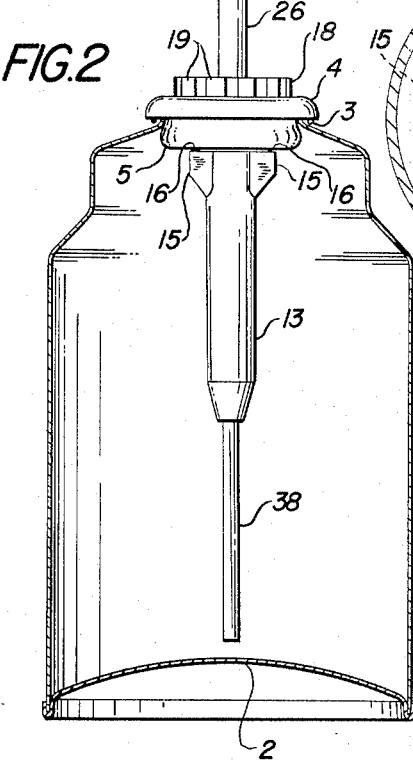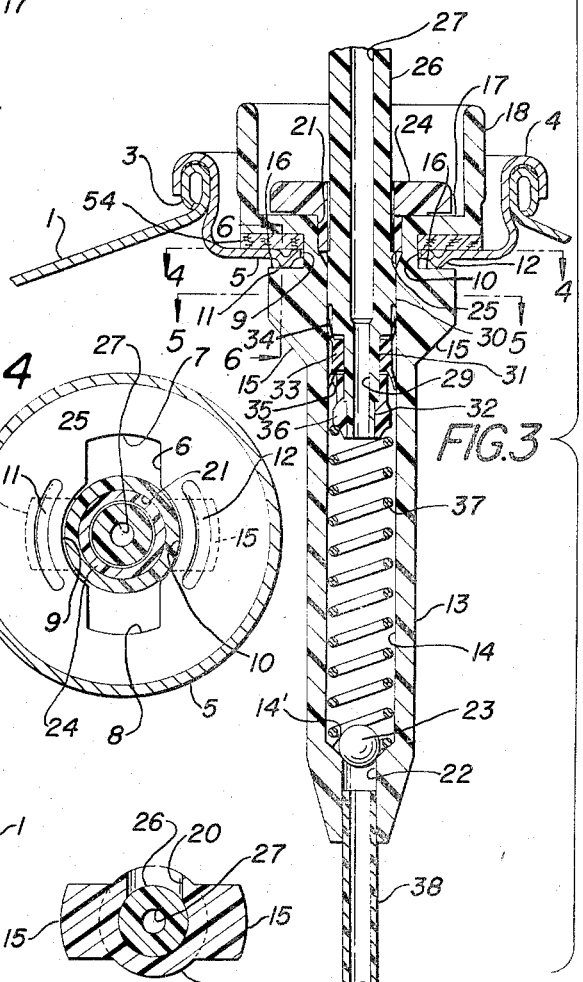

HAND-ACTUATED SPRAYER

Frank A. Ziherl, Euclid, and Arthur S. Kish, Mayfield Heights, Ohio, assignors to Z & W Machine Products, Inc., Cleveland, Ohio, a corporation of Ohio Application February 25, 1954, Serial No. 412,607

6 Claims. (Cl. 299—97)

This invention relates generally to hand-actuated sprayers.

A primary object of the invention is to provide a sprayer unit which may be used in conjunction with conventional cans, as a pressure sprayer, by merely locking the sprayer unit to the can manually, thereby making a pressure spray unit out of a conventional can, without requiring the can to be discarded after the contents thereof have been depleted.

Another object of the invention is to provide a novel sprayer unit which can be readily disassembled for cleaning, and quickly reassembled, without the use of tools, thereby doing away with the disadvantage incident to the use of unitary aerosol pressurized sprayers, which usually have to be discarded after the small openings thereof become sealed or clogged, even though the sprayer may be substantially filled up.

Other objects and advantages of my invention will be apparent during the course of the following description.

In the accompanying drawings forming a part of this specification and in which like numerals are employed to designate like parts throughout the same, Fig. 1 is a top plan view of a sprayer embodying the invention;

Fig. 2 is a view showing the sprayer unit in elevation, and the can, in cross-section;

Fig. 3 is a cross-sectional view, on an enlarged scale, taken on the line 3—3 of Fig. 1;

Fig. 4 is a cross-sectional view, taken on the line 4—4 of Fig. 3;

Fig. 5 is a cross-sectional view, taken on the line 5—5 of Fig. 3, and

Fig. 6 is a fragmentary cross-sectional view, taken on the line 6—6 of Fig. 3.

Referring more particularly to the drawings, the sprayer will be seen to comprise a can 1, closed at the bottom, as by a bottom member 2, and having a curled or beaded upper end 3, to which a cover 4 is frictionally secured, as by crimping the cover over the end 3, in the manner clearly shown in Fig. 3.

The cover 4 is provided with a base portion 5 which is an integral part of the cover, and has an elongated opening 6, which is defined, in part, by arcuate ends 7 and 8, which are concentric with the axis of the base 5, and arcuate sides 9 and 10, which are also concentric with the axis of the base. The base 5 is also provided with downwardly-extending embossments 11 and 12, which are of arcuate form, concentric with the sides 9 and 10, and are inclined in a circumferential direction, as shown in Fig. 6 to provide cam-like lock elements, for a function to be presently described.

Secured to the cover 4, in a manner to be presently described, is a sprayer body, which is preferably molded, in one piece, from cellulose acetate, and comprises a cylindrical lower portion 13 having a passageway 14 therethrough, protuberances 15 extending from diametrically-opposite sides of the portion 13 and providing shoulders 16 at their upper ends, and a cup-like extension at the upper end of the portion 13, which extension comprises a base 17, in spaced relation to the shoulders 16, and an annular flange 18, the upper outer portion of which is provided with circumferentially-spaced ribs 19, which facilitate rotation of the sprayer body.

The sprayer body is provided with a radially-extending slot 20 (Fig. 5), at a circumferential point thereof intermediate the protuberances 15 and immediately above the protuberances 15, the passageway 14 has a counterbore 21. The lower end of the sprayer body has an axial passageway 22, of reduced diameter, which communicates with the passageway 14. The junction of the passageways 14 and 22 forms a seat 14' for a ball check valve 23.

Frictionally secured within the counterbore 21 is a cap 24, also preferably molded from cellulose acetate, and the lower end of which provides a shoulder 25, for a purpose to be presently described.

Mounted for slidable vertically reciprocatory movement in the cap 24 is a plunger 26, preferably made of cellulose acetate, and having an axial bore 27 extending therethrough, provided at its upper end with a counterbore 28 and at its lower end with a bore 29 of reduced diameter. The plunger 26 has a portion 30 adjacent its lower end, of slightly larger external diameter, which portion is slidable in the passageway 14 of the sprayer body.

Below the portion 30 of the plunger, the plunger is provided with a portion 31 of slightly less external diameter than the external diameter of the plunger above the portion 30, and below the portion 31, the plunger is provided with a portion 32 of less external diameter than the portion 31.

Frictionally secured to the portion 31 of the plunger 26 is a seal 33, made of polyethylene, and having an outwardly flared upper extension 34, and a similar outwardly flared lower extension 35. The upper extension 34 is maintained in outwardly flared condition by the engagement therewith of the shoulder formed by the upper end of the portion 31 of the plunger. The lower extension 35 is maintained in outwardly flared condition by the engagement therewith of the upper end of a plunger cap 36, which is frictionally secured to the portions 31 and 32 of the plunger.

A compression coil spring 37 is disposed within the passageway 14 in the sprayer body, the upper end of this spring bearing against the plunger cap 36, and the lower end of the spring bearing against the seat 14'.

Frictionally secured within the passageway 22 in the sprayer body is the upper end of a tube 38 of cellulose acetate which extends downwardly to a point closely adjacent the bottom member 2 of the can 1.

A ball 39 is seated in the counterbore 28 of the plunger, and frictionally secured to the upper end of the plunger is a nozzle body 40, also preferably formed of cellulose acetate, which is provided at its upper end with a curved finger rest 41. The nozzle body 40 has a vertical passageway 42 therein which is communicable with the counterbore 28 of the plunger, and extending laterally from the upper end of the passageway 42 is a small bore 43. The bore 43 communicates with an enlarged bore 44 in a lateral extension 45 of the nozzle body.

Frictionally secured within the bore 44 of the nozzle body is a nozzle 46, preferably made of brass. The nozzle 46 is provided with a front wall 47 having a small nozzle opening 48 therein, and rearwardly of this opening, the wall is provided with a conical surface 49. Disposed within the nozzle 46 is a nozzle insert 50 having helical passageways 51 and 52 which conduct the fluid from the bore 43 through the bore 44 to the opening 48. The nozzle insert 50 is slightly shorter than the length of the cylindrical inner wall of the nozzle 46, so that it floats within the nozzle to permit the fluid to gain access to the helical passageways and flow out of the opening 48.

The nozzle 46 is provided with annular teeth 53 which bite into the wall of the bore 44 after the nozzle has been pushed into this bore, and thus serve to present dislodgement of the nozzle.

In assembling the various parts of the sprayer, the plunger, cap 24, and plunger body are first assembled in the manner shown in Fig. 3, along with the nozzle and associated parts. The aforesaid assembly is then assembled with the can 1 by first passing the protuberances 15 through the opening 6 in the cover 4, until the protuberances have passed below this opening. The assembly is then rotated, so as to cause the shoulders 16 of the protuberances 15 to engage the embossments 11 and 12, continued rotation of the assembly causing the embossments to act as cams which lock the assembly to the cover. Prior to this assembly, a gasket 54 of neoprene and cork is secured to the lower face of the base 17 of the sprayer body.

Assuming that the container 1 contains a fluid which is to be sprayed through the nozzle opening 48, the operation is as follows:

The can 1 is gripped in the hand, and the index finger placed in the finger rest 41. Upon downward movement of the plunger 26 by the index finger, the balls 23 and 39 are lifted from their seats, permitting the fluid to flow up through the passageways 14 and 27. Upon release of pressure on the finger rest, the spring 37 returns the parts to their original position, reseating the balls 23 and 39. A number of strokes will be required to bring the fluid up into the nozzle body.

Continued operation of the sprayer in this manner will cause the fluid to be projected through the opening 48 in a fine spray, which is given a whirling action by the helical passageways 51 and 52 of the nozzle insert, and by the surface 49.

The seal 33, with its flared extensions, effectively seals the space between the portion 31 of the plunger and the wall of the passageway 14 to prevent fluid from passing upwardly through the space between the portion 30 of the plunger and the wall of the passageway 14. However, should any fluid escape above this seal, the provision of the opening or slot 20 permits it to escape back into the fluid reservoir in the can 1.

A primary advantage of the invention resides in the fact that the cans 1 are conventional cans which can be readily purchased in the open market, and through the use of the novel sprayer assembly or unit which I have provided, the unit can be quickly and easily locked to such cans, thereby making a pressure spray unit out of a conventional can, without requiring the can to be thrown away or discarded after the contents thereof have been depleted. In other words, the can may be readily refilled, and the sprayer unit reattached to the can.

Moreover, the parts of the sprayer unit can be readily disassembled for cleaning, and quickly reassembled, without the use of tools. This does away with a disadvantage incident to the use of unitary aerosol pressurized sprayers, which resides in the fact that when the small openings of such sprayers become clogged, the sprayer usually has to be discarded, even though it may be substantially filled up.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In combination, a can for containing a fluid, a spray pump unit, and means removably securing said unit to said can, said means comprising a can top frictionally locked to said can, said top having an elongated opening therein, and said spray unit comprising a body having tenons projecting therefrom and adapted to be passed through said opening and to be rotated about the axis of said top, whereby to removably lock said body to said top.

2. The combination, as defined in claim 1, in which a plunger is mounted for reciprocal movement in said body, and a cap is frictionally secured to said body to provide means for limiting upward movement of the plunger.

3. The combination, as defined in claim 1, in which said can top is provided with downwardly extending arcuate embossments which are concentrate with the axis of said top, said embossments being tapered in a circumferential direction, and said tenons coact with said embossments to cam said body into locking engagement with said top.

4. In combination, a can for containing a fluid, said can having a top having an elongated opening, a spray pump unit secured to said top, said spray pump unit having tenons projecting therefrom and adapted to be passed through said unit from above the opening and to be rotated about the axis of said can after being passed through the opening, whereby to removably lock said unit to said top to thereby secure said unit and cam together to form a single structure, and means on said unit overlying said top for preventing said unit from moving downwardly after being locked to said top.

5. The combination, as defined in claim 4, in which said means comprises a cup-like portion of said unit.

6. In a sprayer of the type described, a sprayer unit comprising a body having a cylindrical bore, a plunger mounted for reciprocal sliding movement in said bore, said plunger having a portion of reduced diameter defining with the wall of said bore an annular space, said plunger having a second portion of a diameter less than that of said first portion and forming a shoulder with said first portion, a seal of flexible plastic material comprising an annular body frictionally secured to said second portion of said plunger and having at one end an outwardly flared flexible extension formed integrally with said annular body portion and extending into said annular space and maintained by said shoulder in wiping engagement with the wall of said cylindrical bore, said annular body having at its other end an outwardly flared extension formed integrally with said annular body, and a sleeve frictionally secured to said second reduced portion of the plunger, said sleeve bearing against said second flared extension to maintain the latter in wiping engagement with the wall of said cylindrical bore, said sleeve also acting to maintain said seal against displacement from said shoulder.

References Cited in the file of this patent

UNITED STATES PATENTS

| 329,067 | Nelson | Oct. 27, 1885 |
| 1,580,246 | Heller | Apr. 13, 1926 |
| 1,623,504 | Stiriss | Apr. 5, 1927 |
| 1,632,218 | Chaffin | June 14, 1927 |
| 1,632,933 | Thornton | June 21, 1927 |
| 1,749,216 | Goldman | Mar. 4, 1930 |
| 2,038,778 | Williams | Apr. 28, 1936 |
| 2,069,212 | Buffington | Feb. 2, 1937 |
| 2,301,051 | King | Nov. 3, 1942 |